United States Patent [19]

Withers et al.

[11] 4,144,947
[45] Mar. 20, 1979

[54] POWER STEERING SYSTEMS

[75] Inventors: John A. Withers; Charles H. Hull; Harry Horsfall, all of Huddersfield, England

[73] Assignee: David Brown Tractors Limited, England

[21] Appl. No.: 855,031

[22] Filed: Nov. 25, 1977

[30] Foreign Application Priority Data

Dec. 10, 1976 [GB] United Kingdom ............... 51610/76
Mar. 25, 1977 [GB] United Kingdom ............... 12581/77

[51] Int. Cl.² .............................................. B62D 5/06
[52] U.S. Cl. ....................................... 180/132; 60/492; 91/436
[58] Field of Search .......................... 180/132; 91/436; 60/392, 388

[56] References Cited

U.S. PATENT DOCUMENTS 3,497,032 2/1970 Schott ............................... 91/436 X
3,587,235 6/1971 Goff ................................... 91/436 X Primary Examiner—John A. Pekar

[57] ABSTRACT

A power steering system for a wheeled agricultural tractor includes a pump circulating oil through a known steering-wheel-operated hydrostatic steering unit. A double-acting hydraulic cylinder communicates via conduits with the steering unit and is connectible to the tractor frame. A piston having a rod which projects from one end only of the cylinder is connectible to steer the tractor. A valve block interposed in the conduits causes oil displaced from the piston-rod end of the cylinder to flow to its other end when oil under pressure is supplied to said other end, and causes oil displaced from said other end to return directly to the steering unit when oil under pressure is supplied to the piston-rod end of the cylinder.

2 Claims, 3 Drawing Figures

U.S. Patent  Mar. 20, 1979  4,144,947
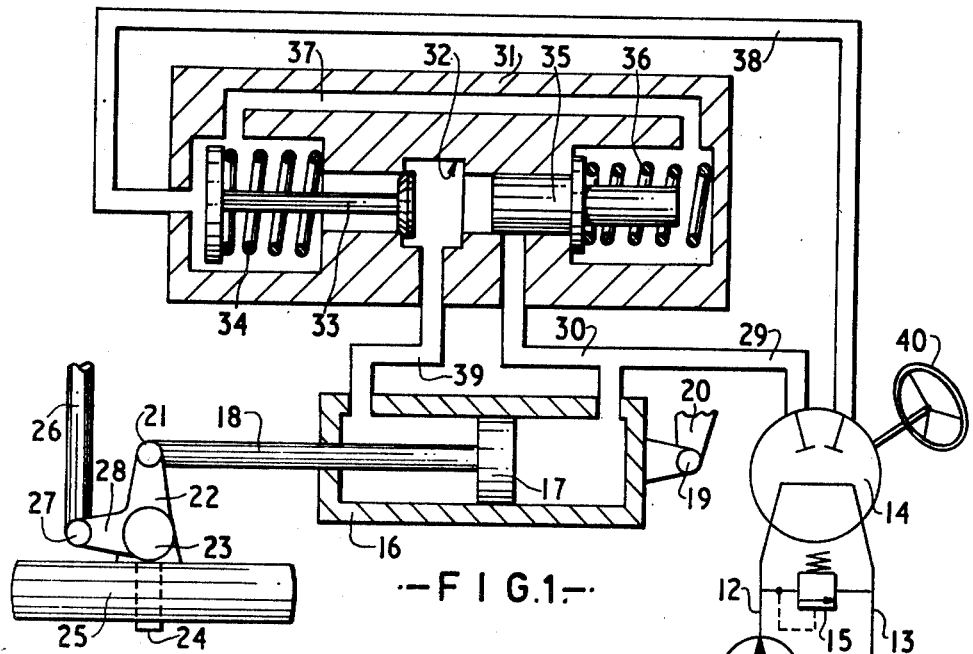
—FIG.1—
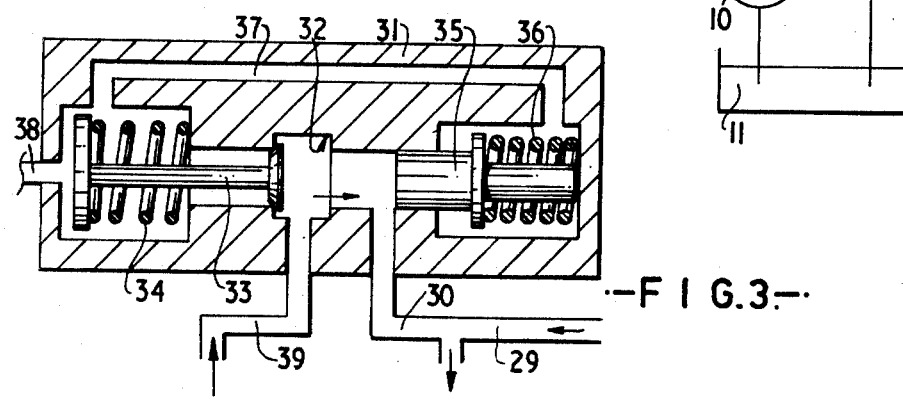
—FIG.3—
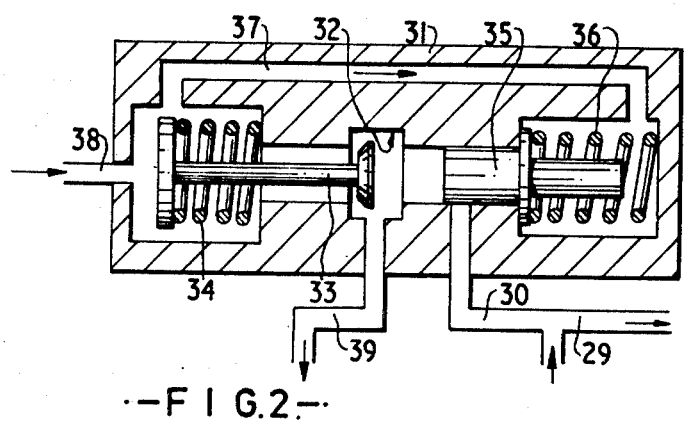
—FIG.2—

POWER STEERING SYSTEMS

BACKGROUND OF THE INVENTION

The invention relates to hydrostatic power steering systems, for vehicles such as agricultural tractors, of the type having a double-acting hydraulic cylinder member containing a piston with a rod member which projects from one end only of the cylinder member, one of said members being connected to the frame of the vehicle and the other being operatively connected to steer the vehicle.

Due to the differences in area between the two end-faces of the piston, such systems have hitherto suffered from the disadvantage of a variable steering ratio.

The object of the invention is to enable this disadvantage to be obviated.

SUMMARY OF INVENTION

According to the invention, a power steering system, for a vehicle, comprises a pump circulating oil through a sterring-wheel-operated hydrostatic steering unit, a double-acting hydraulic cylinder member connected to said unit by conduit means and containing a piston with a rod member which projects from one end only of the cylinder member, one of said members being connectible to the frame of the vehicle and the other being operatively connectible to steer the vehicle, and valve means interposed in said conduit means for causing oil displaced from that end of the cylinder member remote from the piston-rod member to return directly to said unit when oil under pressure is supplied to the piston-rod end of the cylinder member, and for causing oil displaced from the piston-rod end of the cylinder member to flow to the other end thereof by way of the valve means when oil under pressure is supplied to said other end.

BRIEF DESCRIPTION OF DRAWINGS

A preferred embodiment of the invention will not be described, by way of example, with reference to the accompanying drawings of which:

FIG. 1 is a diagrammatic view of a power steering system, including an axial section through a valve block shown in its inoperative condition;

FIG. 2 is the same section through the valve block, shown in one of its operative conditions; and FIG. 3 is the same section through the valve block, shown in its other operative condition.

DESCRIPTION OF PREFERRED EMBODIMENT

Referring now to FIG. 1, a power steering system for an agricultural tractor comprises an engine-driven pump 10 drawing oil from a sump 11 and circulating it by way of supply and return pipes 12 and 13 respectively through a hydrostatic steering unit 14 operated by a steering wheel 40. Said unit can equally well be of the so-called "meter in" type which, when operated, initiates the exhaust of oil prior to permitting the supply of oil under pressure, or of the "meter out" type which, when operated, initiates the supply of oil under pressure prior to permitting the exhaust of oil. The steering unit 14 normally functions as an open-centre rotary valve and can also function in known manner as a manually-operated emergency steering pump in the event of failure of the engine-driven pump 10. The supply and return pipes 12 and 13 respectively are interconnected in known manner by a high pressure relief valve 15. A double-acting hydraulic cylinder 16 contains a piston 17 with a rod 18 which projects from one end only of the cylinder 16. The internal diameter of the cylinder 16 is $\sqrt{2}$ times the external diameter of the piston-rod 18, so that the effective area of one end-face of the piston 17 is twice that of the other. That end of the cylinder 16 remote from the piston-rod 18 is connected by means of a ball joint 19 to the frame 20 of the tractor, and the projecting end of the piston-rod 18 is connected by means of a ball joint 21 to one arm 22 of a bell-crank lever rigidly secured to a king-pin 23 carrying a stub-axle 24 for one of the tractor's front wheels 25. A track-rod 26 is connected at one end by means of a ball joint 27 to the other arm 28 of the bell-crank lever, and at its other end by means of a ball joint to a steering arm rigidly secured to another king-pin carrying a stub-axle for the other of the tractor's front wheels. Said other wheel and its associated parts are conventional and not shown. A first conduit 29 connects the steering unit 14 directly to that end of the cylinder 16 remote from the piston-rod 18 and communicates by way of a branch conduit 30 with a valve block having a body 31. Said body contains a stepped bore 32 housing a poppet-type non-return valve 33 urged in the closing direction by a helical compression spring 34, and a piston-type switching valve 35 urged in the closing direction to blank off the branch conduit 30 by a helical compression spring 36 and also by the pressure in a pilot bore 37 permanently communicating with a second conduit 38 which connects the steering unit 14 to the body 31. A third conduit 39 connects the body 31 to the piston-rod end of the cylinder 16.

In operation, if the steering wheel 40 is turned in one direction, the steering unit 14 supplies oil under pressure through the conduit 38 which causes the non-return valve 33 to open and the switching valve 35 to be held closed as shown in FIG. 2. Oil accordingly flows from the conduit 38 to the piston-rod end of the cylinder 16 by way of the bore 32 and the conduit 39. The piston 17 is therefore forced towards that end of the cylinder 16 remote from the piston-rod 18, and acts through the piston-rod 18, the bell-crank lever 22, 28, the track-rod 26 and the steering arm (not shown) to steer the tractor's front wheels in the appropriate direction. The oil displaced from that end of the cylinder 16 remote from the piston-rod 18, which has a volume twice that of the oil supplied to the piston-rod end of said cylinder, returns directly to the steering unit 14 by way of the conduit 29, and thence by way of the pipe 13 to the sump 11. When the tractor's front wheels have been steered through an angle corresponding to the angular movement of the steering wheel 40, the steering unit 14 automatically ceases to supply and exhaust oil and the valve block accordingly reverts to its inoperative condition shown in FIG. 1.

If the steering wheel 40 is turned in the other direction, the steering unit 14 supplies oil under pressure through the conduit 29 directly to that end of the cylinder 16 remote from the piston-rod 18. As the conduit 38 now communicates by way of the steering unit 14 and the pipe 13 with the sump 11, the non-return valve 33 is closed and there is no pressure in the pilot bore 37 to augment the closing action of the spring 36 on the switching valve 35. The piston 17 is therefore forced towards the piston-rod end of the cylinder 16, and acts through the piston-rod 18, the bell-crank lever 22, 28, the track-rod 26 and the steering arm (not shown) to steer the tractor's front wheels in the opposite direction to that referred to in the preceding paragraph. The oil displaced from the piston-rod end of the cylinder 16, which has a volume half that of the oil required to be supplied to that end of said cylinder remote from the piston-rod 18, cannot return to the steering unit 14 by way of the non-return valve 33 but opens the switching valve 35 against the action of the spring 36 and flows by way of the branch conduit 30 to the conduit 29 in order to augment by an additional equal volume the volume of oil being supplied from the steering unit 14 to that end of the cylinder 16 remote from the piston-rod 18. The valve block is shown in this condition in FIG. 3. The steering unit 14 automatically ceases to supply and exhaust oil, and the valve block accordingly reverts to its inoperative condition shown in FIG. 1, when the tractor's front wheels have been steered through the requisite angle determined by the angular movement of the steering wheel 40.

Given equal angular movements of the steering wheel 40 in both directions, the invention enables the tractor's front wheels to be steered in the corresponding directions through equal angles and with substantially equal forces despite the unequal end-face areas of the piston 17.

We claim:

1. A power steering system, for a vehicle, comprising a pump circulating oil through a steering-wheel-operated hydrostatic steering unit, a double-acting hydraulic cylinder member connected to said unit by conduit means and containing a piston with a rod member which projects from one end only of the cylinder member, the internal diameter of the cylinder member being $\sqrt{2}$ times the external diameter of the piston-rod member and one of said members being connectible to the frame of the vehicle while the other is operatively connectible to steer the vehicle, and valve means interposed in said conduit means for causing oil displaced from that end of the cylinder member remote from the piston-rod member to return directly to said unit when oil under pressure is supplied to the piston-rod end of the cylinder member, and for causing oil displaced from the piston-rod end of the cylinder member to flow to the other end thereof by way of the valve means when oil under pressure is supplied to said other end, the conduit means comprising a first conduit which connects the hydrostatic steering unit directly to that end of the cylinder member remote from the piston-rod member and communicates by way of a single branch conduit with the valve means, a second conduit which connects said unit to the valve means, and a third conduit which connects the valve means to the piston-rod end of the cylinder member, and the valve means comprising a non-return valve for permitting oil flow from the second conduit to the third conduit but not vice versa, and a switching valve urged in the closing direction by resilient means and also by the pressure in a pilot bore permanently communicating with the second conduit for preventing oil flow from the first conduit to the other conduits when oil under pressure is being supplied to the second conduit, and urged in the opening direction against the action of said resilient means by the pressure in the third conduit for permitting oil flow from the third conduit to the first conduit when oil under pressure is being supplied to the first conduit.

2. A power steering system according to claim 1, wherein the cylinder member is connectible to the frame of the vehicle and the piston-rod member is operatively connectible to steer the vehicle's front wheels.

* * * * *